Dec. 26, 1950        R. F. WHITE        2,535,379
ELECTRIC COOKING UNIT

Filed Dec. 30, 1944        3 Sheets-Sheet 1

INVENTOR.
Richard F. White
BY
Barnes, Kisselle, Laughlin & Raisch
Attorneys

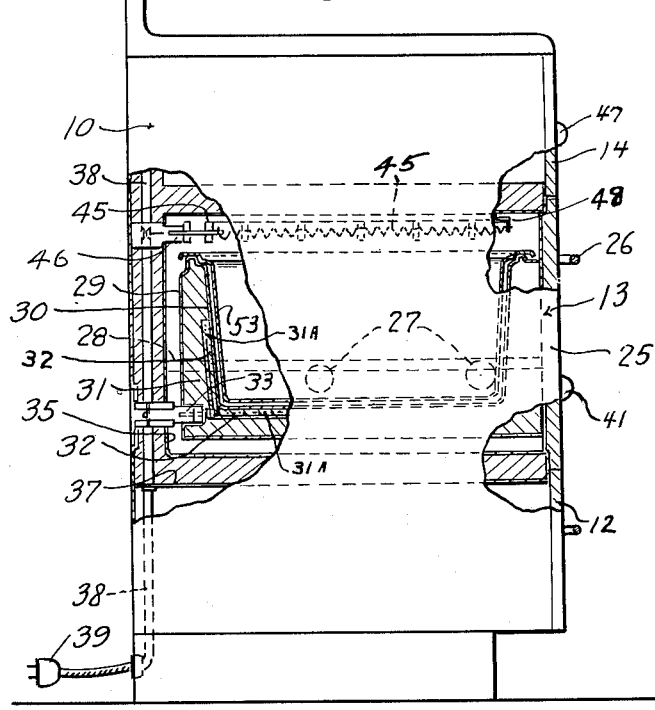

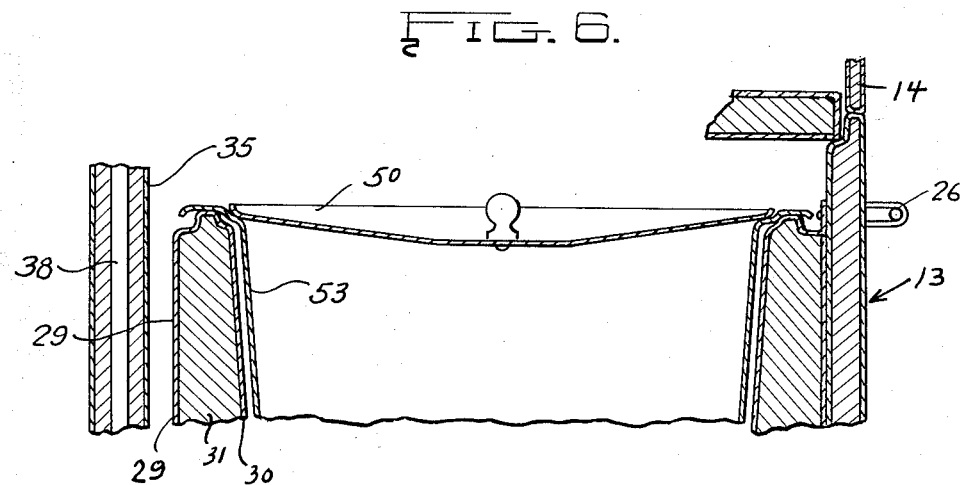
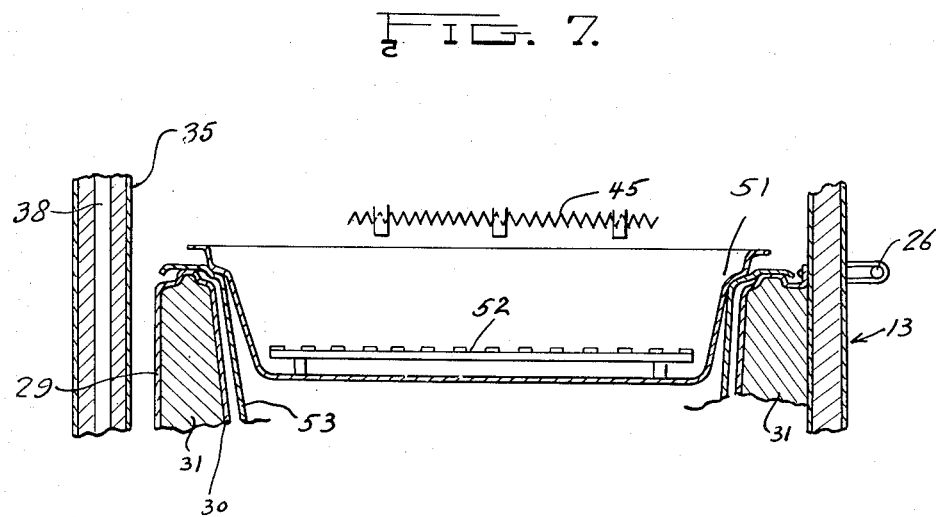

Patented Dec. 26, 1950

2,535,379

UNITED STATES PATENT OFFICE 2,535,379

ELECTRIC COOKING UNIT

Richard F. White, Salem, Ohio, assignor to Mullins Manufacturing Corporation, Salem, Ohio, a corporation of New York Application December 30, 1944, Serial No. 570,581

4 Claims. (Cl. 219—35)

This invention relates to an electric stove construction and has particularly to do with a construction for combining the functions of an electric roaster with a kitchen utility unit combining a drawer supported roaster and broiler heating elements.

It is an object of the present invention to provide a convenient storage and supporting means for an electric roaster combining therewith safety features which disconnect the power to the roaster at any time that it is shifted from heating position.

It is a further object of the present invention to provide a roasting unit which can be readily converted to a broiling unit at the will of the operator.

Other features of the invention relating to details of construction will appear in the following description and claims:

In the drawings:

Fig. 3 is a side elevation partially in section showing the relative position of the various elements of the unit.

Fig. 4 is an enlarged section of a portion of Fig. 3.

Fig. 5 is a view similar to Fig. 4 showing the parts in disconnected relation.

Fig. 6 illustrates the roaster drawer with a cover in position.

Fig. 7 illustrates a roaster drawer with a broiler pan supported therein.

Figure 1:
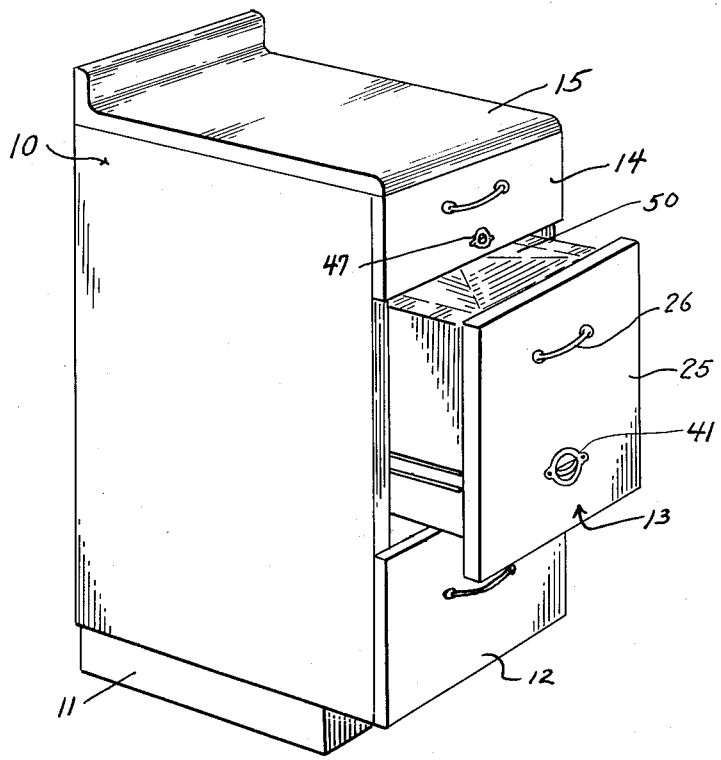
Fig. 1 is a perspective view of the kitchen unit showing the roaster drawer.
Figure 2:
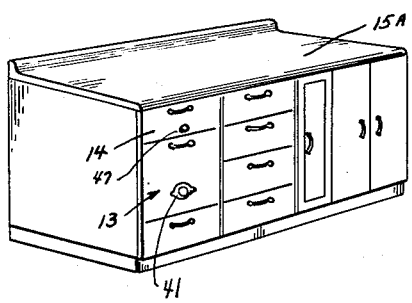
Fig. 2 illustrates a kitchen assembly in which the unit may be installed under a common top.

In the drawings a kitchen cabinet unit shown generally at 10 has a base 11, a front panel or drawer head 12, and a drawer 13 slidable in the cabinet. Above the drawer is a front panel 14 which may be used for mounting controls in case a stove top is above the roasting unit. A cover unit 15 rests on the cabinet. In Fig. 2 a kitchen assembly group is shown in which the roaster unit is arranged below a common top 15A.

In Fig. 3, the drawer 13 is shown generally as having a front panel 25 which cooperates with the other panels 12 and 14 of the stove to present a solid front. A handle 26 may be used to open and close the drawer which slides on rollers 27 in tracks 28. The main portion of the drawer is formed by metal sheaths 29 and 30 between which is a layer of insulating material 31.

The insulating material 31 may be a mineral wool or other standard heat insulating material. Directly adjacent the bottom and lower sides of the drawer casing 30 is a layer 31A of "Silmanite." This material is a high heat resisting refractory material which comes in powder form and is mixed with water to a paste, after which it can be molded into shape as desired. It is also a non-conductor of electricity when dried or baked out. In the bottom and sides of the drawer, embedded in this insulation, is a heating unit formed of Nichrome wire indicated generally at 32. This heating unit is connected to contact projections 33 which are mounted in a recess 34 in the lower portion of the drawer. In the back of the stove projecting through the back lining 35 is a socket member 36 supported in insulating material 37 which surrounds the drawer opening. This socket member is electrically hooked up with an electric conduit 38 connected to a plug 39.

When the drawer is in closed position the parts will bear the relation shown in Fig. 4 where the projections 33 are held in the plug 36 so that connections are made from a source of electricity to the heating unit of the drawer. A separate switch 41 is used also to control the heat in the drawer or to shut off current to the drawer.

Above the drawer, but within the drawer opening, is a broiler unit 45 supported at the top of the drawer opening and removable therefrom for cleaning and repair. This unit is also connected to the conduit 38 by a projection and plug arrangement 46 similar to that described for the drawer. The electrical connection supports the broiler unit at the rear end. Any suitable control may be used for this broiler unit such as a switch mounted on panel 14. A sliding hook device 47 supports the front end of the broiler.

The electric conduit 38 continues up to a point at the top of the stove where it may connect with any other electrical appliances desired.

The top of the drawer 13 is recessed to receive a cover 50 when the drawer is being used for roasting purposes. This cover is completely removable and in its place a broiler pan 51 may be supported. The broiler pan projects downwardly into the drawer for a short distance and has in the bottom a supporting rack 52. The broiler heating unit 45 may be used in conjunction with this broiler pan. Within the drawer recess is a pan 53 removable for cleaning. This pan 53 cooperates to support broiler pan 51, Fig. 8, although broiler pan 51 may be supported at the top of the drawer recess in the absence of pan 53.

I claim:

1. In a kitchen cabinet, an electric roasting and broiling unit comprising a drawer slidably mounted in said cabinet and including a removable food receptacle in said drawer, a heating unit for roasting embedded in one wall of said drawer, a broiling heating unit positioned in said cabinet above said drawer in a manner not to interfere with the movement of the drawer in and out, and a drawer cover and broiling rack pan supported alternatively at the top of said drawer for the respective uses of said device.

2. In a kitchen cabinet, a drawer opening, a panel for closing the front of the drawer opening, and a drawer mounted on said panel to slide in said opening, the sides and back of the drawer having a shorter vertical dimension than the opening, a heating unit embedded in the bottom of said drawer, a second heating unit mounted in the drawer opening of said cabinet above the drawer and projecting below the upper edge of said panel, and means alternatively supportable on said drawer as cover means for roasting, said cover means also being shaped to support food on the upper face thereof adjacent said second heating unit thereby making possible the alternate or joint use of said heating units.

3. In a kitchen cabinet, insulating walls defining a drawer opening in the cabinet, a panel for closing the front of the drawer opening, a drawer formed behind said panel slidable in said opening but having vertical dimensions shorter than those of said opening, a removable receptacle having walls adjacent the walls of said drawer, a heating unit removably supported in said opening above said drawer and below the upper edge of said panel, a heating unit in a sidewall of said drawer, and means supported by said drawer acting as a cover for said receptacle and shaped to support articles for broiling below said heating unit making possible the alternate or joint use of said heating units.

4. In a kitchen cabinet of the type having two parallel sides, a back, and a top at belt level, an electric roaster oven drawer mounted between the sides and slightly below the top in slidable relation to the cabinet, means including a track and rollers to mount said drawer in slidable relation, electric resistance elements in one or more of the drawers in said cabinet and embedded with heat resistant insulation material, and connecting means engageable to connect said elements to a source of electricity when said drawer is pushed into closed position in said cabinet and disengageable when the drawer moves forward in the cabinet comprising a projecting socket plug mounted on the back of said cabinet projecting toward the drawer, recesses in said plug, means within said recesses for conducting electricity from a source, and a recess formed in the back of said drawer to receive said plug and prongs projecting from the base of said recess and connecting to said elements whereby when said drawer is in closed position the elements are connected to the source of electricity through said connecting means.

RICHARD F. WHITE.

REFERENCES CITED

The following references are of record in the file of this patent:

UNITED STATES PATENTS

| Number | Name | Date |
|---|---|---|
| 1,179,340 | Smith | Apr. 11, 1916 |
| 1,341,994 | Nelson | June 1, 1920 |
| 2,138,706 | Myers | Nov. 29, 1938 |
| 2,221,870 | Kahn et al. | Nov. 19, 1940 |
| 2,276,661 | Lockwood | Mar. 17, 1942 |
| 2,291,359 | Uhlrig et al. | July 28, 1942 |
| 2,371,975 | Parsons | Mar. 20, 1945 |